US012800516B2

(12) United States Patent
Asefi et al.

(10) Patent No.: US 12,800,516 B2
(45) Date of Patent: Nov. 17, 2026

(54) RAY-BASED IMAGING IN GRAIN BINS

(71) Applicants: AGCO CORPORATION, Duluth, GA (US); UNIVERSITY OF MANITOBA, Winnipeg (CA)

(72) Inventors: Mohammad Asefi, Winnipeg (CA); Max Aaron Kelner Hughson, Winnipeg (CA); Hannah Claire Fogel, Winnipeg (CA); Ian Jeffrey, Winnipeg (CA); Joe LoVetri, Winnipeg (CA); Colin Gerald Gilmore, Winnipeg (CA)

(73) Assignee: University of Manitoba, Winnipeg (CA)

( * ) Notice: Subject to any disclaimer, the term of this patent is extended or adjusted under 35 U.S.C. 154(b) by 374 days.

(21) Appl. No.: 18/551,694

(22) PCT Filed: Mar. 14, 2022

(86) PCT No.: PCT/IB2022/052267

§ 371 (c)(1),
(2) Date: Sep. 21, 2023

(87) PCT Pub. No.: WO2022/200909

PCT Pub. Date: Sep. 29, 2022

(65) Prior Publication Data

US 2024/0183798 A1 Jun. 6, 2024

Related U.S. Application Data

(60) Provisional application No. 63/163,959, filed on Mar. 22, 2021.

(51) Int. Cl.

| | |
|---|---|
| ***G01N 22/04*** | (2006.01) |
| ***G01F 23/284*** | (2006.01) |
| ***G06T 12/20*** | (2026.01) |

(52) U.S. Cl.

CPC ........... *G01N 22/04* (2013.01); *G01F 23/284* (2013.01); *G06T 12/20* (2026.01)

(58) Field of Classification Search

CPC ...... G01N 22/04; G06T 11/006; G01F 23/284

See application file for complete search history.

(56) References Cited

U.S. PATENT DOCUMENTS

| | | | | |
|---|---|---|---|---|
| 6,281,801 B1 * | 8/2001 | Cherry | .................. | G01N 22/04 73/61.41 |
| 6,691,563 B1 * | 2/2004 | Trabelsi | ................ | G01N 22/04 73/73 |

(Continued)

FOREIGN PATENT DOCUMENTS

| | | |
|---|---|---|
| WO | 2021001796 A1 | 1/2021 |
| WO | 2022200909 A1 | 9/2022 |

OTHER PUBLICATIONS

J. R. Ernst, H. Maurer, A. G. Green and K. Holliger, “Full-Waveform Inversion of Crosshole Radar Data Based on 2-D Finite-Difference Time-Domain Solutions of Maxwell’s Equations,” in IEEE Transactions on Geoscience and Remote Sensing, vol. 45, No. 9, pp. 2807-2828, Sep. 2007 (Year: 2007).*

(Continued)

*Primary Examiner* — Vladimir Magloire
*Assistant Examiner* — Anna K. Gosling
(74) *Attorney, Agent, or Firm* — Kyle R Satterthwaite; Ryan W Dupuis; Ade & Company Inc.

(57) ABSTRACT

In one embodiment, an electromagnetic imaging method, comprising: determining frequency domain information from measurements; converting the frequency domain information to time domain information; and using the time domain information to parametrically describe a state of a stored commodity.

19 Claims, 7 Drawing Sheets

(56) References Cited

U.S. PATENT DOCUMENTS

| | | | |
|---|---|---|---|
| 2004/0031335 | A1 | 2/2004 | Fromme et al. |
| 2014/0218230 | A1 | 8/2014 | Ostadrahimi et al. |
| 2014/0354299 | A1 | 12/2014 | Rapoport |
| 2015/0168313 | A1 | 6/2015 | Jean |
| 2016/0033316 | A1 | 2/2016 | Honeck |
| 2017/0199134 | A1 | 7/2017 | LoVetri et al. |
| 2020/0072766 | A1 | 3/2020 | Reimer et al. |
| 2020/0337589 | A1 | 10/2020 | Schrattenecker et al. |

OTHER PUBLICATIONS

C. Gilmore, I. Jeffrey, M. Asefi, N. T. Geddert, K. G. Brown and J. Lovetri, "Phaseless Parametric Inversion for System Calibration and Obtaining Prior Information," in IEEE Access, vol. 7, pp. 128735-128745, 2019 (Year: 2019).*

European Patent Office, Search Report for related PCT Application No. PCT/IB2022/052267, dated May 24, 2022, 16 pages.

Mohammad Asefi et al.: "Detection and continuous monitoring of localised high-moisture regions in a full-scale grain storage bin using electromagnetic imaging", Biosystems Engineering, vol. 163, 2017, pp. 37-49, ISSN 1537-5110, DOI: 10.1016/j.biosystemseng.2017.08.015.

Colin Gilmore et al: "Industrial scale electromagnetic grain bin monitoring", Computers and Electronics in Agriculture, vol. 136, 2017, pp. 210-220, ISSN 0168-1699, DOI: 10.1016/j.compag.2017.03.005.

Mohammad Asefi et al: "Grain bin monitoring via electromagnetic imaging", Computers and Electronics in Agriculture, vol. 119, 2015, pp. 133-141, ISSN 0168-1699, DOI: 10.1016/j.compag.2015.10.016.

Colin Gilmore et al: "Phaseless parametric inversion for system calibration and obtaining prior information," IEEE Access, vol. 7, pp. 128735-128745, 2019, INSS 2169-3536, DOI:10.1109/ACCESS.2019.2939725.

Joe LoVetri et al: "Innovations in electromagnetic imaging technology: The stored-grain-monitoring case," IEEE Antennas and Propagation Magazine, vol. 62, pp. 33-43, 2020, DOI: 10.1109/MAP.2020.3003206.

Keeley Edwards et al: "Stored Grain Inventory Management Using Neural-Network-Based Parametric Electromagnetic Inversion," IEEE Access, vol. 8, pp. 207182-207192, INSS: 2169-3536, DOI: 10.1109/ACCESS.2020.3038312.

Vahab Khoshdel et al: "Enhancement of multimodal microwave-ultrasound breast imaging using a deep-learning technique," Sensors, 2019, p. 4050 DOI: 10.3390/s19184050.

Vahab Khoshdel et al: "Full 3d microwave breast imaging using a deep-learning technique," Journal of Imaging, vol. 6, No. 8, p. 80, 2020, DOI: 10.3390/jimaging6080080.

Asefi Mohmmad et al: "Surface-Current Measurements as Data for Electromagnetic Imaging Within Metallic Enclosures", IEEE Transactions on Microwave Theory and Techniques, vol. 64, pp. 4039-4047, DOI: 10.1109/TMTT.2016.2605665.

Goodfellow, Ian, Yoshua Bengio, and Aaron Courville. Deep learning. MIT press, 2016.

Olaf Ronneberger et al: "U-net: Convolutional networks for biomedical image segmentation," CoRR, vol. abs/1505.04597, 2015. [Online].

Timo Lahivaara et al: "Estimation of moisture content distribution in porous foam using microwave tomography with neural networks", Cornell Univerity Library, 201, NY 14853, Sep. 11, 2020, XP081760362, DOI: 10.1109/TCI.2020.3022828.

Isaak Kavasidis et al: "Brain2Image: Converting Brain Signals into Images", Association for Computing Machinery, 2017, pp. 1809-1817, DOI: 10.1145/3123266.3127907.

Keeley Edwards et al: "A Machine Learning Workflow for Tumour Detection in Breasts Using 3D Microwave Imaging", Eletronics, vol. 10, p. 674, 2021, DOI: 10.3390/electronics10060674.

Li et al: "Deepnis: Deep neural network for nonlinear electromagnetic inverse scattering", IEEE Transactions on Antennas and Propagation, vol. 67, pp. 1819-1645, 2019.

Anonymous: "U-Net—Wikipedia", Mar. 5, 2021, pp. 1-3, XP055930080, Retrieved from the Internet: https://web.archive.orq/web/20210305142013/https://en.wikipedia.org/wiki/U-Net [retrieved on Jun. 10, 2022].

Anonymous: "Ensemble averaging (machine learning)—Wikipedia", Feb. 20, 2020, pp. 1-3, XP055930108, Retrieved from the Internet: https://web.archive.org/web/20200220180211 /https://en.wikipedia.org/wiki/Ensemble averaging (machine learning) [retrieved on Jun. 10, 2022].

* cited by examiner

RAY-BASED IMAGING IN GRAIN BINS

CROSS-REFERENCE TO RELATED APPLICATION

This application is a national phase entry under 35 U.S.C. § 371 of International Patent Application PCT/IB2022/052267, filed Mar. 14, 2022, designating the United States of America and published in English as International Patent Publication WO 2022/200909 A1 on Sep. 29, 2022, which claims the benefit of U.S. Provisional Application No. 63/163,959, filed Mar. 22, 2021, which is hereby incorporated by reference in its entirety.

TECHNICAL FIELD

The present disclosure is generally related to electromagnetic imaging of containers.

BACKGROUND

The safe storage of grains is crucial to securing the world's food supply. Estimates of storage losses vary from 2 to 30%, depending on geographic location. Grains are usually stored in large containers, referred to as grain silos or grain bins, after harvest, and can be left there for days to years. Because of non-ideal storage conditions, spoilage and grain loss are inevitable. Consequently, continuous monitoring of the stored grain is an essential part of the post-harvest stage for the agricultural industry. Recently, electromagnetic inverse imaging (EMI) using radio frequency (RF) excitation has been proposed to monitor the moisture content of stored grain. The possibility of using electromagnetic waves to quantitatively image grains, and the motivation to do so, derives from the well-known fact that the dielectric properties of agricultural products (e.g., the complex-valued permittivity) vary with their physical attributes, such as the moisture content and the temperature, which in turn, indicates their physiological state.

Part of existing grain imaging products involves the creation of a coarse parametric model of the stored grain that is subsequently used as prior information for full grain moisture imaging (FGMI). The coarse parametric model is also used to calibrate scattered field data used by the FGMI algorithm. Currently, the coarse parametric model used in some grain imaging technology consists of only four (4) parameters: grain height at the storage bin wall, cone angle, and real and imaginary parts of the complex-valued permittivity ($\varepsilon r$ and $\varepsilon i$). These parameters are obtained using uncalibrated, magnitude-only, total field measurements between the antennas of the storage bin, a step sometimes referred to as retrieval of the bulk average moisture content (BAMC). After the BAMC step, which provides an average moisture content (AMC) throughout the stored grain as well as an inventory of the amount of stored grain (estimated from the height and cone angle), the acquired scattered field measurements may be calibrated to provide both magnitude and phase of the measurements to the FGMI algorithm.

Existing grain bin imaging relies on fully non-linear, full wave imaging techniques, such as contrast source inversion (CSI). However, the methods of CSI are computationally expensive and time-consuming in producing an imaging map.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
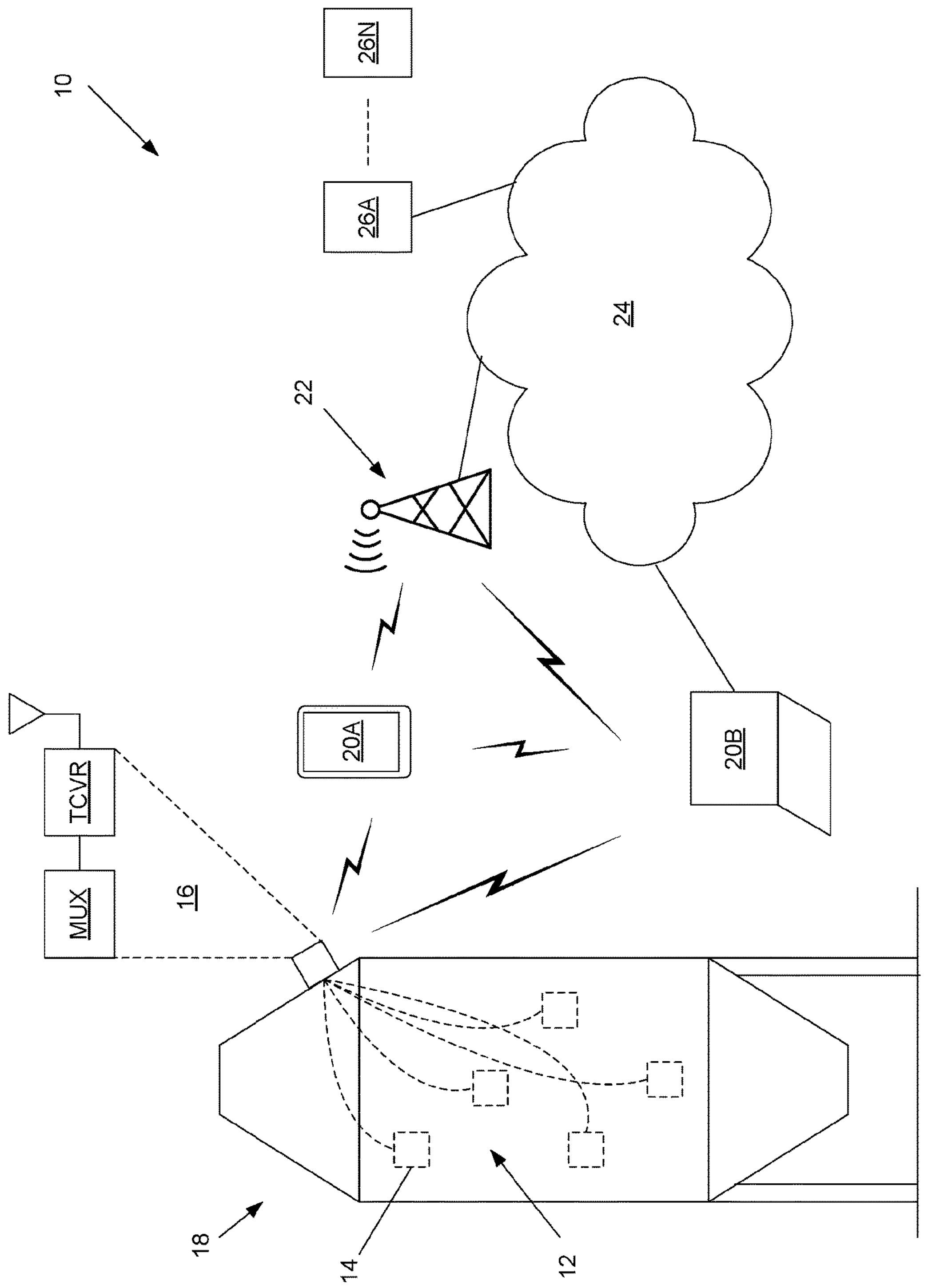
FIG. 1 is a schematic diagram that illustrates an example environment in which an embodiment of an electromagnetic imaging system may be implemented.

In one embodiment, an electromagnetic imaging method, comprising: determining frequency domain information from measurements; converting the frequency domain information to time domain information; and using the time domain information to parametrically describe a state of a stored commodity.

DETAILED DESCRIPTION

Certain embodiments of an electromagnetic imaging system and method are disclosed that improve upon the aforementioned bulk average moisture content (BAMC) process by creating higher-order, and therefore more accurate, parametric models of a state of a stored commodity (e.g., grain). In one embodiment, a whole domain basis function, ray based inversion model is implemented and that is configured to extract the coefficients of a higher-order set of basis functions that are then used to parametrically describe the state of the stored grain. One algorithm uses time-of-flight determinations between each pair of antennas/sensors arranged within a container (e.g., storage bin). In such an approach, a wave speed of the stored grain is reconstructed parametrically. Another algorithm uses attenuation of a signal between each transmitter/receiver pair of sensors, which enables reconstruction of a wave attenuation coefficient of the stored grain. Both parametric reconstructions may be based on (e.g., initially) uncalibrated data, and may be used to improve calibration (e.g., more accuracy) of acquired data.

In some embodiments, in addition to, or in lieu of the whole domain basis embodiment, a resonance system is used that measures resonances of the storage bin. The resonances are indications of, for instance, a fill-level of the bin, as well as other features (e.g., complex-valued permittivity of the stored grain). The resonances are extracted from wide-band (frequency-domain or time-domain) data collected between each transmitter/receiver pair of sensors. In addition to the resonances, the signals are modeled by a set of poles and zeros representing an equivalent transfer-function between the sensors. These pole/zero representations provide information about the stored grain (e.g., its geometry and/or physical properties of the grain).

In some embodiments, any one of a plurality of neural network (e.g., deep learning) techniques may be used both for extraction of information in one or both of the above-mentioned algorithms as well as in fusing the data from each technique.

Digressing briefly, obtaining highly accurate reconstructions of the complex-valued permittivity generally requires the use of computationally expensive iterative techniques, such as those found in contrast source inversion (CSI) techniques (e.g., Finite-Element (FEM) forward model CSI). This is especially true when trying to image highly inhomogeneous scatterers with high contrast values. Despite the advances made during the last twenty years, images containing reconstruction artifacts still remain an issue. As for reconstruction time, the traditional CSI technique, with its iterative approach, may consume hours of processing time and require extensive computational resources. In contrast, certain embodiments of an electromagnetic imaging system replace in whole or in part forward solves and, in general, the CSI approach, improving computation speed and reducing imaging artifacts, as well as, in some embodiments, improving accuracy of an initial guess/prior information and calibration of data.

Having summarized certain features of an electromagnetic imaging system of the present disclosure, reference will now be made in detail to the description of an electromagnetic imaging system as illustrated in the drawings. While an electromagnetic imaging system will be described in connection with these drawings, there is no intent to limit it to the embodiment or embodiments disclosed herein. For instance, in the description that follows, one focus is on grain bin monitoring, and in particular, the imaging of grain as a stored commodity. However, certain embodiments of an electromagnetic imaging system may be used to determine the features of other contents/commodities of a container, including one or any combination of other materials or solids, fluids, or gases, as long as such contents reflect electromagnetic waves. Additionally, certain embodiments of an electromagnetic imaging system may be used in other industries, including the medical industry, among others. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

FIG. 1 is a schematic diagram that illustrates an example environment 10 in which an embodiment of an electromagnetic imaging system may be implemented. It should be appreciated by one having ordinary skill in the art in the context of the present disclosure that the environment 10 is one example among many, and that some embodiments of an electromagnetic imaging system may be used in environments with fewer, greater, and/or different components than those depicted in FIG. 1. The environment 10 comprises a plurality of devices that enable communication of information throughout one or more networks. The depicted environment 10 comprises an antenna array 12 comprising a plurality of antenna probes 14 and an antenna acquisition system 16 that is used to monitor contents, or as equivalently used herein, a commodity, within a container 18 and uplink with other devices to communicate and/or receive information. The container 18 is depicted as one type of grain storage bin (or simply, grain or storage bin), though it should be appreciated that containers of other geometries, for the same (e.g., grain) or other contents, with a different arrangement (side ports, etc.) and/or quantity of inlet and outlet ports, may be used in some embodiments. As is known, electromagnetic imaging uses active transmitters and receivers of electromagnetic radiation to obtain quantitative and qualitative images of one or more features (e.g., the complex dielectric profile) of an object of interest (e.g., here, the contents or grain).

As shown in FIG. 1, multiple antenna probes 14 of the antenna array 12 are mounted along the interior of the container 18 in a manner that surrounds the contents to effectively collect the scattered signal. For instance, each transmitting antenna probe is polarized to excite/collect the signals scattered by the contents. That is, each antenna probe 14 illuminates the contents while the receiving antenna probes or sensors collect the signals scattered by the contents. The antenna probes 14 are connected (via cabling, such as coaxial cabling) to a radio frequency (RF) switch matrix or RF multiplexor (MUX) of the antenna acquisition system 16, the switch/mux switching between the transmitter/receiver pairs. That is, the RF switch/mux enables each antenna probe 14 to either deliver RF energy to the container 18 or collect the RF energy from the other antenna probes 14. The switch/mux is followed by an electromagnetic transceiver (TCVR) system of the antenna acquisition system 16 (e.g., a vector network analyzer or VNA). The electromagnetic transceiver system generates the RF wave for illumination of the contents of the container 18 as well as receiving the measured fields by the antenna probes 14 of the antenna array 12. As the arrangement and operations of the antenna array 12 and antenna acquisition system 16 are known, further description is omitted here for brevity. Additional information may be found in the publications "Industrial scale electromagnetic grain bin monitoring", *Computers and Electronics in Agriculture,* 136, 210-220, Gilmore, C., Asefi, M., Paliwal, J., & LoVetri, J., (2017), "Surface-current measurements as data for electromagnetic imaging within metallic enclosures", *IEEE Transactions on Microwave Theory and Techniques,* 64, 4039, Asefi, M., Faucher, G., & LoVetri, J. (2016), and "A 3-d dual-polarized near-field microwave imaging system", *IEEE Trans. Microw. Theory Tech.*, Asefi, M., OstadRahimi, M., Zakaria, A., LoVetri, J. (2014).

Note that in some embodiments, the antenna acquisition system 16 may include additional circuitry, including a global navigation satellite systems (GNSS) device or triangulation-based devices, which may be used to provide location information to another device or devices within the environment 10 that remotely monitors the container 18 and associated data. The antenna acquisition system 16 may include suitable communication functionality to communicate with other devices of the environment.

The uncalibrated, raw data collected from the antenna acquisition system 16 is communicated (e.g., via uplink functionality of the antenna acquisition system 16) to one or more devices of the environment 10, including devices 20A and/or 20B. Communication by the antenna acquisition system 16 may be achieved using near field communications (NFC) functionality, Blue-tooth functionality, 802.11-based technology, satellite technology, streaming technology, including LoRa, and/or broadband technology including 3G, 4G, 5G, etc., and/or via wired communications (e.g., hybrid-fiber coaxial, optical fiber, copper, Ethernet, etc.) using TCP/IP, UDP, HTTP, DSL, among others. The devices 20A and 20B communicate with each other and/or with other devices of the environment 10 via a wireless/cellular network 22 and/or wide area network (WAN) 24, including the Internet. The wide area network 24 may include additional networks, including an Internet of Things (IOT) network, among others. Connected to the wide area network 24 is a computing system comprising one or more servers 26 (e.g., 26A . . . 26N).

The devices 20 may be embodied as a smartphone, mobile phone, cellular phone, pager, stand-alone image capture device (e.g., camera), laptop, tablet, personal computer, workstation, among other handheld, portable, or other computing/communication devices, including communication devices having wireless communication capability, including telephony functionality. In the depicted embodiment of FIG. 1, the device 20A is illustrated as a smartphone and the device 20B is illustrated as a laptop for convenience in illustration and description, though it should be appreciated that the devices 20 may take the form of other types of devices as explained above.

The devices 20 provide (e.g., relay) the (uncalibrated, raw) data sent by the antenna acquisition system 16 to one or more servers 26 via one or more networks. The wireless/cellular network 22 may include the necessary infrastructure to enable wireless and/or cellular communications between the device 20 and the one or more servers 26. There are a number of different digital cellular technologies suitable for use in the wireless/cellular network 22, including: 3G, 4G, 5G, GSM, GPRS, CDMAOne, CDMA2000, Evolution-Data Optimized (EV-DO), EDGE, Universal Mobile Telecommunications System (UMTS), Digital Enhanced Cordless Telecommunications (DECT), Digital AMPS (IS-136/TDMA), and Integrated Digital Enhanced Network (iDEN), among others, as well as Wireless-Fidelity (Wi-Fi), IEEE 802.11, streaming, etc., for some example wireless technologies.

The wide area network 24 may comprise one or a plurality of networks that in whole or in part comprise the Internet. The devices 20 may access the one or more server 26 via the wireless/cellular network 22, as explained above, and/or the Internet 24, which may be further enabled through access to one or more networks including PSTN (Public Switched Telephone Networks), POTS, Integrated Services Digital Network (ISDN), Ethernet, Fiber, DSL/ADSL, Wi-Fi, among others. For wireless implementations, the wireless/cellular network 22 may use wireless fidelity (Wi-Fi) to receive data converted by the devices 20 to a radio format and process (e.g., format) for communication over the Internet 24. The wireless/cellular network 22 may comprise suitable equipment that includes a modem, router, switching circuits, etc.

The servers 26 are coupled to the wide area network 24, and in one embodiment may comprise one or more computing devices networked together, including an application server(s) and data storage. In one embodiment, the servers 26 may serve as a cloud computing environment (or other server network) configured to perform processing required to implement an embodiment of an electromagnetic imaging system. When embodied as a cloud service or services, the server 26 may comprise an internal cloud, an external cloud, a private cloud, a public cloud (e.g., commercial cloud), or a hybrid cloud, which includes both on-premises and public cloud resources. For instance, a private cloud may be implemented using a variety of cloud systems including, for example, Eucalyptus Systems, VMWare vSphere®, or Microsoft® HyperV. A public cloud may include, for example, Amazon EC2®, Amazon Web Services®, Terremark®, Savvis®, or GoGrid®. Cloud-computing resources provided by these clouds may include, for example, storage resources (e.g., Storage Area Network (SAN), Network File System (NFS), and Amazon S3®), network resources (e.g., firewall, load-balancer, and proxy server), internal private resources, external private resources, secure public resources, infrastructure-as-a-services (IaaSs), platform-as-a-services (PaaSs), or software-as-a-services (SaaSs). The cloud architecture of the servers 26 may be embodied according to one of a plurality of different configurations. For instance, if configured according to MICROSOFT AZURE™ roles are provided, which are discrete scalable components built with managed code. Worker roles are for generalized development, and may perform background processing for a web role. Web roles provide a web server and listen for and respond to web requests via an HTTP (hypertext transfer protocol) or HTTPS (HTTP secure) endpoint. VM roles are instantiated according to tenant defined configurations (e.g., resources, guest operating system). Operating system and VM updates are managed by the cloud. A web role and a worker role run in a VM role, which is a virtual machine under the control of the tenant. Storage and SQL services are available to be used by the roles. As with other cloud configurations, the hardware and software environment or platform, including scaling, load balancing, etc., are handled by the cloud.

In some embodiments, the servers 26 may be configured into multiple, logically-grouped servers (run on server devices), referred to as a server farm. The servers 26 may be geographically dispersed, administered as a single entity, or distributed among a plurality of server farms. The servers 26 within each farm may be heterogeneous. One or more of the servers 26 may operate according to one type of operating system platform (e.g., WINDOWS-based O.S., manufactured by Microsoft Corp. of Redmond, Wash.), while one or more of the other servers 26 may operate according to another type of operating system platform (e.g., UNIX or Linux). The group of servers 26 may be logically grouped as a farm that may be interconnected using a wide-area network connection or medium-area network (MAN) connection. The servers 26 may each be referred to as, and operate according to, a file server device, application server device, web server device, proxy server device, or gateway server device.

In one embodiment, one or more of the servers 26 may comprise a web server that provides a web site that can be used by users interested in the contents of the container 18 via browser software residing on a device (e.g., device 20). For instance, the web site may provide visualizations that reveal physical properties (e.g., moisture content, permittivity, temperature, density, etc.) and/or geometric and/or other information about the container and/or contents (e.g., the volume geometry, such as cone angle, shape, height of the grain along the container wall, etc.).

The functions of the servers 26 described above are for illustrative purpose only. The present disclosure is not intended to be limiting. For instance, functionality of an electromagnetic imaging system may be implemented at a computing device that is local to the container 18 (e.g., edge computing), or in some embodiments, such functionality may be implemented at the devices 20. In some embodiments, functionality of an electromagnetic imaging system may be implemented in different devices of the environment 10 operating according to a primary-secondary configuration or peer-to-peer configuration. In some embodiments, the antenna acquisition system 16 may bypass the devices 20 and communicate with the servers 26 via the wireless/cellular network 22 and/or the wide area network 24 using suitable processing and software residing in the antenna acquisition system 16.

Note that cooperation between the devices 20 (or in some embodiments, the antenna acquisition system 16) and the one or more servers 26 may be facilitated (or enabled) through the use of one or more application programming interfaces (APIs) that may define one or more parameters that are passed between a calling application and other software code such as an operating system, a library routine, and/or a function that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer employs to access functions supporting the API. In some implementations, an API call may report to an application the capabilities of a device running the application, including input capability, output capability, processing capability, power capability, and communications capability.

An embodiment of an electromagnetic imaging system may include any one or a combination of the components of the environment 10. For instance, in one embodiment, the electromagnetic imaging system may include a single computing device (e.g., one of the servers 26 or one of the devices 20) comprising all or in part the functionality of the electromagnetic imaging system, and in some embodiments, the electromagnetic imaging system may comprise the antenna array 12, the antenna acquisition system 16, and one or more of the server 26 and/or devices 20. For purposes of illustration and convenience, implementation of an embodiment of an electromagnetic imaging system is described in the following as being implemented in a computing device (e.g., comprising one or a plurality of GPUs and/or CPUs) that may be one of the servers 26, with the understanding that functionality may be implemented in other and/or additional devices.

In one example operation, a user (via the device 20) may request measurements of the contents of the container 18. This request is communicated to the antenna acquisition system 16. In some embodiments, the triggering of measurements may occur automatically based on a fixed time frame or based on certain conditions or based on detection of an authorized user device 20. In some embodiments, the request may trigger the communication of measurements that have already occurred. The antenna acquisition system 16 activates (e.g., excites) the antenna probes 14 of the antenna array 12, such that the acquisition system (via the transmission of signals and receipt of the scattered signals) collects a set of raw, uncalibrated electromagnetic data at a set of (a plurality of) discrete, sequential frequencies (e.g., 10-100 Mega-Hertz (MHz), though not limited to this range of frequencies nor limited to collecting the frequencies in sequence). In one embodiment, the uncalibrated data comprises total-field, S-parameter measurements. As is known, S-parameters are ratios of voltage levels (e.g., due to the decay between the sending and receiving signal). Though S-parameter measurements are described, in some embodiments, other mechanisms for describing voltages on a line may be used. For instance, power may be measured directly (without the need for phase measurements), or various transforms may be used to convert S-parameter data into other parameters, including transmission parameters, impedance, admittance, etc. Since the uncalibrated S-parameter measurement is corrupted by the switching matrix and/or varying lengths and/or other differences (e.g., manufacturing differences) in the cables connecting the antenna probes 14 to the antenna acquisition system 16, some embodiments of an electromagnetic imaging system may use only magnitude (i.e., phaseless) data as input, which is relatively unperturbed by the measurement system. The antenna acquisition system 16 communicates (e.g., via a wired and/or wireless communications medium) the uncalibrated (S-parameter) data to the device 20, which in turn communicates the uncalibrated data to the server 26. At the server 26, data analytics are performed using an electromagnetic imaging system as described further below.

In the description that follows, an embodiment of a whole-domain basis function system configured as a ray based imaging system is described, followed by a description of a resonance-based system. Though described separately, and in fact offering benefits to existing systems when implemented mutually exclusively, in some embodiments, the systems may be combined in what is also referred to herein as a data fusion technique for parametric-based imaging of a stored commodity. That is, the algorithms associated with the ray and resonance based systems improve upon the BAMC process by creating higher-order (and more accurate) parametric models of the state of the stored grain. These high order parametric models may be created by fusing information of the algorithms (in the time and frequency domains). It should be appreciated that these techniques are not limited to parametric modelling of stored grain, but may be extended to providing information about other stored commodities, including liquid commodities. Deep learning techniques may also be used for or in conjunction with the ray based system, resonance based system, or both.

Figure 2:
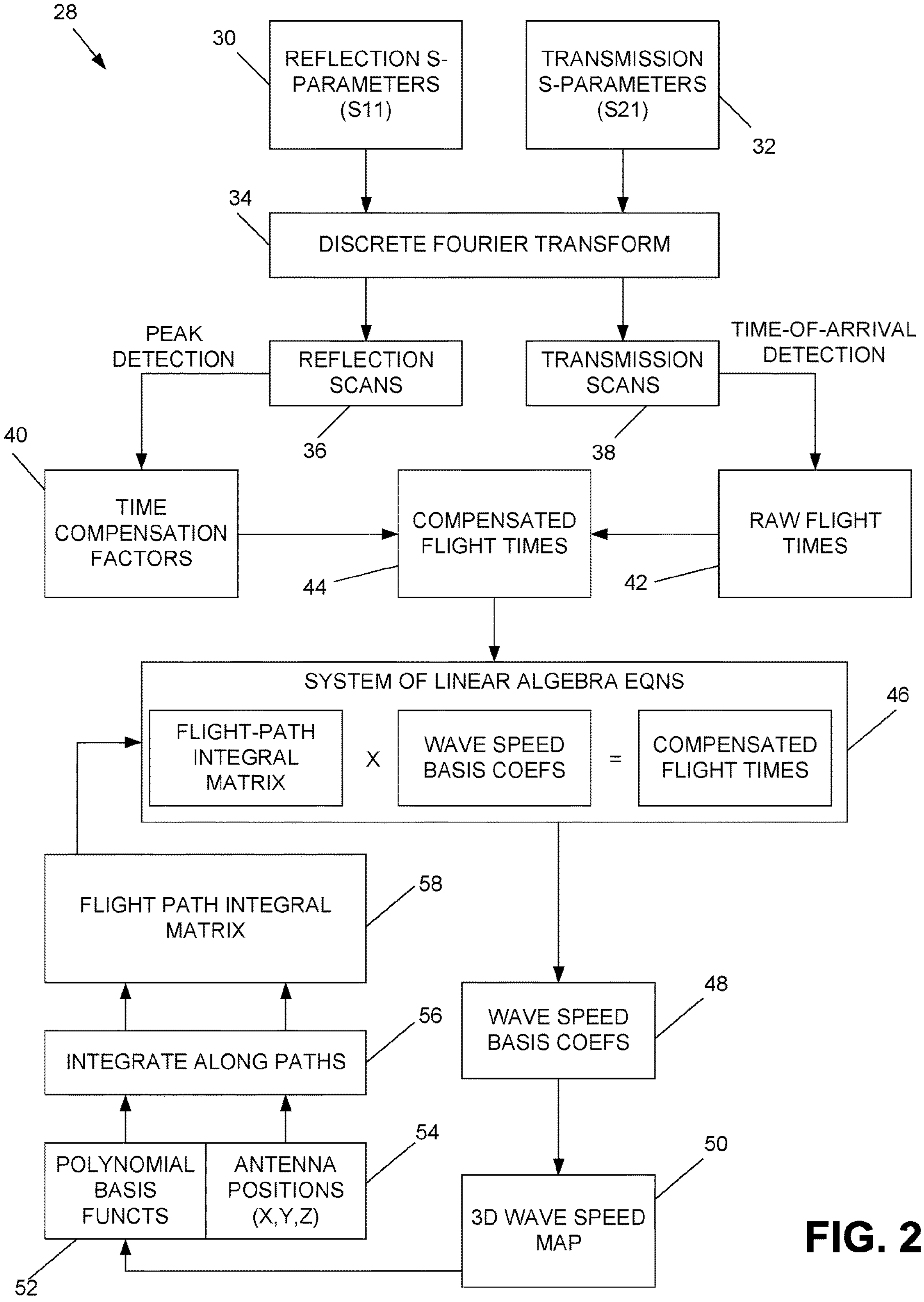
FIG. 2 is a schematic diagram that illustrates one embodiment of a whole domain basis system implemented by an embodiment of an electromagnetic imaging system to determine features of a stored commodity.

Referring to FIG. 2, shown is an embodiment of an electromagnetic imaging system configured as a whole-domain basis, ray based imaging system 28 (hereinafter, also referred to simply as a ray-based imaging system). The ray-based imaging system 28 is depicted in, and described below, in terms of logical function blocks (with a function represented by their associated label), with the understanding that the associated functionality may be performed using one or more processors, software, and/or electronic circuitry co-located or performed using distributed mechanisms. The ray-based imaging system 28 comprises reflection S-parameters (S11) 30 and transmission S-parameters (S21) 32, a discrete Fourier transform 34, reflection scans 36, transmission scan 38, time compensation factors 40 that receive peak detection from the reflection scans 36, raw flight times 42 that receive time-of-arrival detections from the transmission scans 38, and compensated flight times 44 that receive input from the time compensation factors 40 and the raw flight times 42. The ray-based imaging system 28 further comprises a system of linear algebra equations 46 comprising the depicted relationship between flight-path integral matrix, wave speed basis coefficients, and compensated flight times. At the output of the system of linear algebra equations 46 is wave speed basis coefficients 48, from which a three-dimensional (3D) wave speed map 50 is derived. The ray-based imaging system 28 further comprises a polynomial branch comprising polynomial basis functions 52 and antenna positions (x, y, z) 54 that are integrated along paths 56 to derive a flight path integral matrix 58, which is inputted to the system of linear algebra equations 50. Within the context of the example ray-based imaging system 28, functionality of the same is described below.

As indicated above, and digressing briefly, current imaging technologies rely on fully non-linear, fullwave imaging techniques, and typically, contrast source inversion (CSI). However, these methods are computationally expensive, and potentially involve millions of degrees of freedom. Further, current systems, operating under a frequency domain, typically collect many data points per day (e.g., 1300 data points), yet from that vast collection, only use a small subset of data points (e.g., 5-8 data points) to, for example, train a neural network. It is noted that forward solves discretize a domain, compounding quickly the amount of data elements to process.

In contrast, the ray-based imaging system 28 assesses all data points (e.g., in the example above, all 1300 data points per day) by processing the same in the time domain. The processing may involve determining a time for a signal to travel along a ray between transmitter and receiver, as well as the signal behavior. Also, time-of-flight data from grain bin frequency sweeps is acquired. This imaging algorithm produces good, quantitative images of grain properties, with such images being not only informative and useful on their own, but also able to provide a source of prior information for the more complicated imaging algorithms, such as FEM-CSI. In some embodiments, resulting information may be used to provide an image and/or train a neural network.

Explaining further, the ray-based imaging system 28 assumes a simple physical model. Such a model is constructed by assuming that, between two antennas, the electromagnetic wave front travels along a ray between the transmitter and receiver. Let $t_{kl}$ be the propagation time from antenna k to antenna l. Let $P_{kl}$ be the linear path between the two antennas. Let $c^{-1}(\vec{r})$ be the inverse of spatially-varying wave speed. Then, the time-of-flight from one antenna to the other is as follows (Eqn. 1):

$$t_{kl} = \int_{Pkl} c^{-1}(\vec{r})dl \tag{1}$$

For ray-based imaging, it is often useful to have incident field data (i.e., measurements taken with no target in the region of interest) as well. If incident field measurements are available, and the wave speed in the empty region is known ($c_0$), then the equation for the change in arrival time can be expressed as follows (Eqn. 2):

$$t_{kl} = \int_{Pkl} \left(c^{-1}(\vec{r}) - c_0^{-1}\right)dl \tag{2}$$

Focusing on the lower portion of FIG. 2, in one embodiment, the ray-based imaging system 28 uses polynomial basis functions. Given a set of integration paths, together with a set of flight-times (t) or a set of time-of-arrival differences (Δt), it is possible to derive a model for the wave speed in a region of interest. First, the wave speed is expanded in some finite basis (Eqn. 3):

$$c^{-1}(\vec{r}) = \sum_{j=1}^{N} \alpha_j \phi_j(\vec{r}) \tag{3}$$

Substituting (3) into an equation for time-of flight provides the following:

$$t_{kl} = \int_{Pkl} \sum_{j=1}^{N} \alpha_i \phi_j(\vec{r})dl \tag{4}$$

$$t_{kl} = \sum_{j=1}^{N} \alpha j \int_{Pkl} \phi_j(\vec{r})dl \tag{5}$$

Expressing the time vector t in terms of the basis coefficient vector α, a matrix equation is obtained (Eqn. 6):

$$C\underline{\alpha} = \underline{t} \tag{6}$$

Here, C is a matrix. The number of rows in C is the number of integrals being performed, which is the number of transmitter-receiver pairs. The number of columns in C is the number of basis functions used to express $c^{-1}(\vec{r})$. Furthermore:

$$Cij = \int_{Pi} \phi_j(\vec{r})dl \tag{7}$$

That is, the (i, j) element of C is the integral of the $j^{th}$ basis function along the path of the $i^{th}$ transmitter-receiver pair.

Note that in some embodiments, pulse-basis functions may be integrated along transmitter-receiver paths. However, there may be insufficient local coupling of pulse basis functions. For instance, pulse-basis functions may be defined by a tetrahedral mesh (e.g., where each mesh element is only interrogated by a couple transmitter-receiver paths or none at all), where some images may result where speed may be calculated for only a couple of mesh elements. By expressing material properties in a polynomial basis, sufficient spatial coupling may result in some embodiments. Polynomial basis functions have infinite support, so every polynomial basis function intersects every transmitter-receiver path.

The wave-speed may be reconstructed by solving the equation Cα=t. With the material properties expressed in a polynomial basis, it is suitable to simply calculate the least-squares solution to the system, either as $\alpha=(C^TC)^{-1}C^Tt$, or $\alpha={}^{C}T(CC^T)^{-1}t$ depending on the shape of C. The polynomial basis technique produces superior images to the pulse basis technique in scenarios where the spatial resolution of the target is on the same scale as the distance between transmitters (e.g., a grain anomaly with a diameter of a few feet, within a grain bin).

In some embodiments, a modified energy ratio is used to pick a time-of-arrival for time domain signals. For instance, the system determines the arrival time of x(t), then find the maximum of R(t), where R(t) is defined as the following (Eqn. 8):

$$R(t) = \left[\left(\left(\int_t^{t+\tau} x(u)^2du\right)\right)/\left(\int_{t-\tau}^{t} x(u)^2du\right)\right)|x(t)|\right]^3 \tag{8}$$

Here, τ (tau) is a window size. The fraction term calculates the ratio of energy in a window to the right of t compared to the energy in a window to the left of t. This ratio is multiplied by the absolute value of x(t), and the right hand side of the equation cubed. In some embodiments, the cube operation may be omitted. As noted by logical blocks 52-58 in FIG. 2, polynomial basis functions along linear paths are integrated according to the following form:

$$I_{i,j,k} = (x_0 + k_x s)^i (y_0 + k_y s)^j (z_0 + k_z s)^k ds \quad (9)$$

where:

$I_{i,j,k}$ is the integral sought, $x_0$, $y_0$, $z_0$ are the coordinates of the beginning of the path, i, j, k are the degrees of the x, y, z monomials, s=0 corresponds to the beginning of the path, s=S corresponds to the end of the path, where S is the total path length, and $k_x$, $k_y$, $k_z$ are the components of the unit vector along the path. Eqn. 9 is just a single-variable polynomial that is to be integrated. However, one challenge is that, in the form above, what the coefficients of the polynomial are is not obvious. In one embodiment, the conv( ) function in Matlab may be used, which enables simple calculation of the coefficients of arbitrary polynomials. Together with polyint( ) and polyval( ), the integrals of the basis functions along all of the transmitter-receiver paths are easy to calculate. Again, the modified energy ratio is used to pick time-of-arrival for the time-domain scans.

The imaging is performed by calculating a solution to the matrix equation (Eqn. 6). C is not square, and is possibly ill-conditioned. In some embodiments, the matrix equation is solved using a standard least squares solution (via $(C^T C)^{-1} C^T t$), which produces better images than, for instance, using iterative methods to solve the matrix.

As indicated above, by expressing material properties in a polynomial basis, each basis function is interrogated by every transmitter-receiver path. Compared to pulse basis approaches, the polynomial basis requires no mesh, and has one parameter (the degree of the polynomials), while the pulse basis has many (mesh size, characteristic length, number of solver iterations, solver tolerance). The polynomial basis also acceptably represents the smooth simple shape of a grain pile.

Continuing the explanation of the ray-based imaging system 28 of FIG. 2, the ray-based imaging system 28 creates three-dimensional (3D) wave speed images using S-parameters obtained from frequency sweeps in grain bins. The ray-based system 28 is developed and tested on synthetic data. The following describes the steps implemented to use real data obtained from grain bins in the imaging process. In general, time-of-flight tomography is a quantitative imaging method that uses a simplified model of wave physics, together with a set of time-domain data, to generate images of wave speed and attenuation in an imaging domain. The time-domain data is generated by transmitting a time-windowed pulse from some transmitting antenna, and measuring the pulse at some receiving antenna. This process is repeated for many transmitters and many receivers. The received signal is causal (i.e., it is zero until the pulse arrives at the receiver). The time that the pulse arrives at the receiver is known as the time of arrival of the pulse along the path from the transmitter to the receiver. The time of arrival may be used to determine the pulse's speed in the imaging domain. The power of the received signal may be used to determine the pulse's attenuation in the imaging domain. It takes time for the pulse to travel from the transmitter, through the imaging medium, to the receiver. In a practical imaging scenario, the pulse does not originate at the transmitting antenna. The pulse originates at a generator, then travels to the transmitting antenna through cables, which act as transmission lines. Additionally, there is a delay in the received signal because the receiving antenna is connected to a measurement device through a cable. The pulse loses power at several points from the generator to the measurement device. Energy is lost as the pulse travels along cables, and as the pulse travels through the imaging domain. The antenna-grain or antenna-grain interface represents an impedance mismatch, which decreases the energy of the pulse. In some systems, the impedance mismatch is significant, so the pulse is strongly attenuated at both the transmitting antenna and the receiving antenna.

As an illustration of the losses, consider the journey taken by a pulse for a single time-domain scan, from transmitter i to receiver j. The pulse is generated at the signal generator and the receiver begins recording. Then, the pulse travels along cable i, introducing cable delay $$d_{CBL}^{(i)},$$

and cable attenuation $$a_{CBL}^{(i)}.$$

The pulse moves from the transmitting antenna into the imaging domain, introducing antenna attenuation $$a_{ANT}^{(i)}.$$

The pulse travels through the imaging medium, introducing delay $$d_{MED}^{(i,j)}$$

and attenuation $$a_{MED}^{(i,j)}.$$

The pulse moves from the imaging medium to the receiving antenna, introducing attenuation $$a_{ANT}^{(i)}.$$

The pulse travels along cable j, introducing cable delay $$d_{CBL}^{(i)},$$

and cable attenuation $$a_{CBL}^{(j)}.$$

Finally, the pulse arrives at the measurement device.

In one embodiment of the ray-based imaging system 28, properties of interest in the imaging domain include the inverse speed and attenuation. Inverse speed (sometimes referred to as slowness) is represented by $c^{-1}$, with units of $sm^{-1}$. Attenuation is represented by α, with units of dB $cm^{-1}$ $MHz^{-1}$. The properties of the imaging medium are expanded in some basis, which allows the representation of the properties by a set of basis coefficients. The equations which describe attenuation and delay in the imaging medium enables the building of the set of linear algebraic equations, which relate the basis coefficients of the properties to the time of arrival and power of the measured pulse. The basis coefficients of the properties may be calculated by solving a system of equations. The properties recovered by time-of-flight tomography include inverse speed and attenuation. However, for purposes of imaging features of the grain, permittivity and conductivity of grain are more useful, mainly because there are methods to translate from those two properties to grain moisture and temperature. In one embodiment, permittivity and conductivity are obtained from inverse speed and attenuation according to the following.

Suppose a pulse is transmitted from transmitter i to receiver j. Suppose a transmitted pulse begins its journey at time t=0, and has power $P_0$. Let $t^{(i,j)}$ be the apparent time of arrival, as observed by the measurement device.

$$t^{(i,j)} = d_{CBL}^{(i)} + d_{MED}^{(i,j)} + d_{CBL}^{(j)} \tag{10}$$

Let $p^{(i,j)}$ be the measured power of the pulse, as observed by the measurement device.

$$p^{(i,j)} = p_0 a_{CBL}^{(i)} a_{ANT}^{(i)} a_{MED}^{(i,j)} a_{ANT}^{(j)} a_{CBL}^{(j)} \tag{11}$$

The inverse speed in the medium may be approximated by integrating the slowness of the medium along the path from transmitter i to receiver j.

$$d_{MED}^{(i,j)} = \int_{C(i,i)} c^{-1}(\vec{r}(I))dl \tag{12}$$

The linear attenuation in the medium may be approximated by integrating the attenuation of the medium along C(i,j). Attenuation is expressed in dB $cm^{-1}$ $MHz^{-1}$, and can be translated to linear attenuation as follows:

$$10\log_{10}\left(a_{MED}^{(i,j)}\right) = -\left(fc/10^6\right)100\int_{C(i,j)} \alpha\left(\vec{r}(l)\right)dl \tag{13}$$

$$\left(a_{MED}^{(i,j)}\right) = 10\wedge\left[\left(\frac{fc}{10\wedge 5}\right)\int_{C(i,j)} \alpha\left(\vec{r}(l)\right)dl\right] \tag{14}$$

It is cumbersome and inconvenient to work with a in an exponent. Instead, logs of Equation 11 may be taken.

$$10\log_{10}\left(p^{(i,j)} = 10\ \log_{10}\left(P_0 a_{CBL}^{(i)} a_{ANT}^{(i)} a_{MED}^{(i,j)} a_{ANT}^{(j)} a_{CBL}^{(j)}\right) \tag{15}$$

-continued $$10\log_{10}\left(p^{(i,j)} = 10\ \log_{10}\left(P_0 a_{CBL}^{(i)} a_{ANT}^{(i)} a_{ANT}^{(j)} a_{CBL}^{(j)}\right) + 10\ \log_{10}\left(a_{MED}^{(i,j)}\right) \tag{16}$$

$$10\log_{10}\left(a_{MED}^{(i,j)} = 10\ \log_{10}\left(p^{(i,j)} - 10\ \log_{10}\left(P_0 a_{CBL}^{(i)} a_{ANT}^{(i)} a_{ANT}^{(j)} a_{CBL}^{(j)}\right) \tag{17}$$

The quantities obtained from integrating the two properties along the i-j path are as follows.

$$\int_{C(i,j)} c^1\left(\vec{r}(I)\right)dl = t^{(i,j)} - d_{CBL}^{(i)} - d_{CBL}^{(j)} \tag{18}$$

$$\int_{C(i,j)} \alpha\left(\vec{r}(I)\right)dl = \left(-10^5/fc\right)\ \log_{10}\left(p^{(i,j)} - \left(-10^5/fc\right)\ \log_{10}\left(P_0 a_{CBL}^{(i)} a_{ANT}^{(i)} a_{ANT}^{(j)} a_{CBL}^{(j)}\right) \tag{19}$$

Figure 3A:
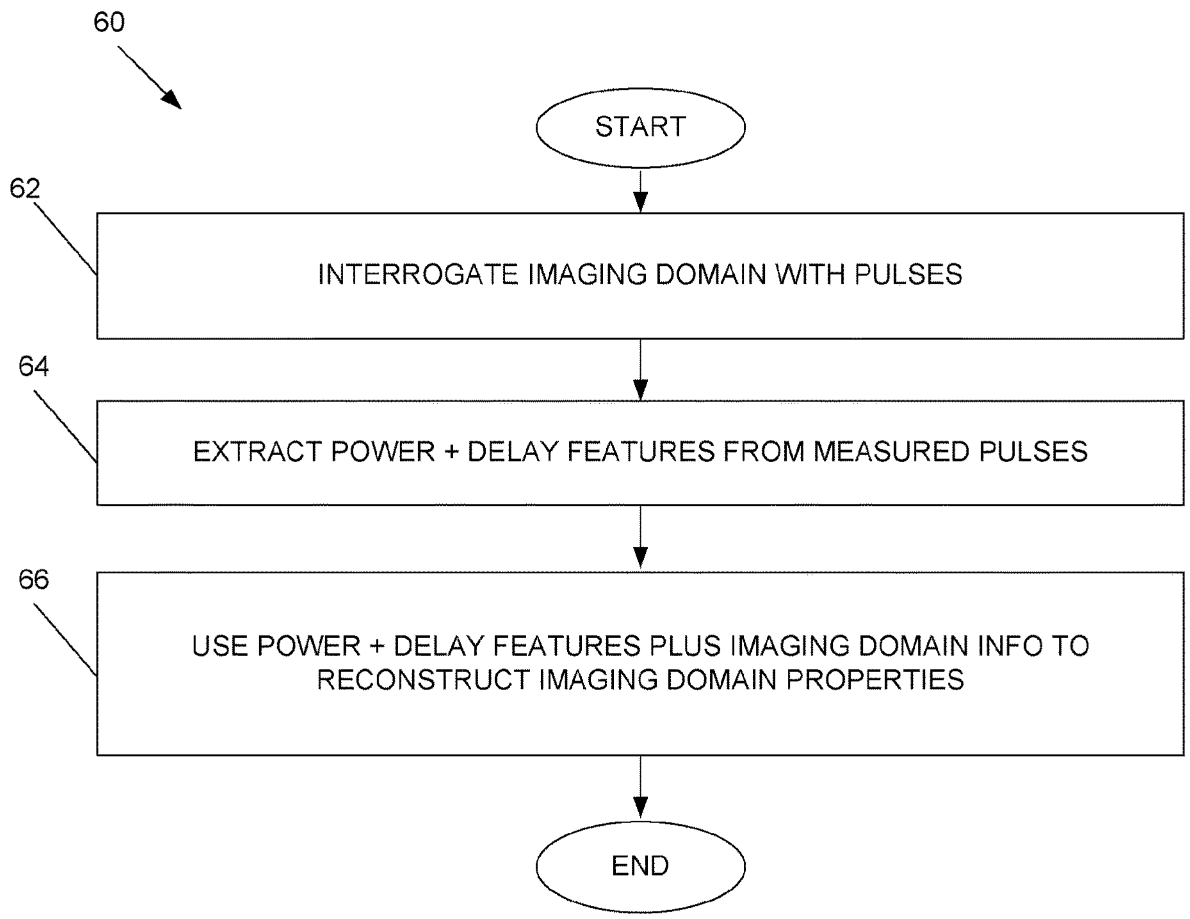
FIGS. 3A-3B are schematic diagrams that illustrate embodiments of example methods of total-field imaging and scattered-field imaging for an embodiment of an electromagnetic imaging system.

The delay equation has $t^{(i,j)}$ on its right-hand-side, and the linear attenuation equation has $p^{(i,j)}$ on its right-hand-side. The two right-hand-sides also contain several other factors, referred to as compensation factors. The compensation factors are generally not affected by the properties of the imaging domain, since they are properties of the imaging system. If the properties of the imaging domain change, the compensation factors are expected to stay constant. The absence or presence of accurate compensation factors is an important feature that separates total-field imaging from scattered-field imaging. Referring to FIG. 3A, one embodiment of an example process of total-field imaging 60 comprises the following: interrogate imaging domain, whose properties are unknown, with pulses (62), extract power and delay features from measured pulses (64), and use power and delay features, together with knowledge of the imaging system, to reconstruct properties of the imaging domain (66).

Figure 3B:
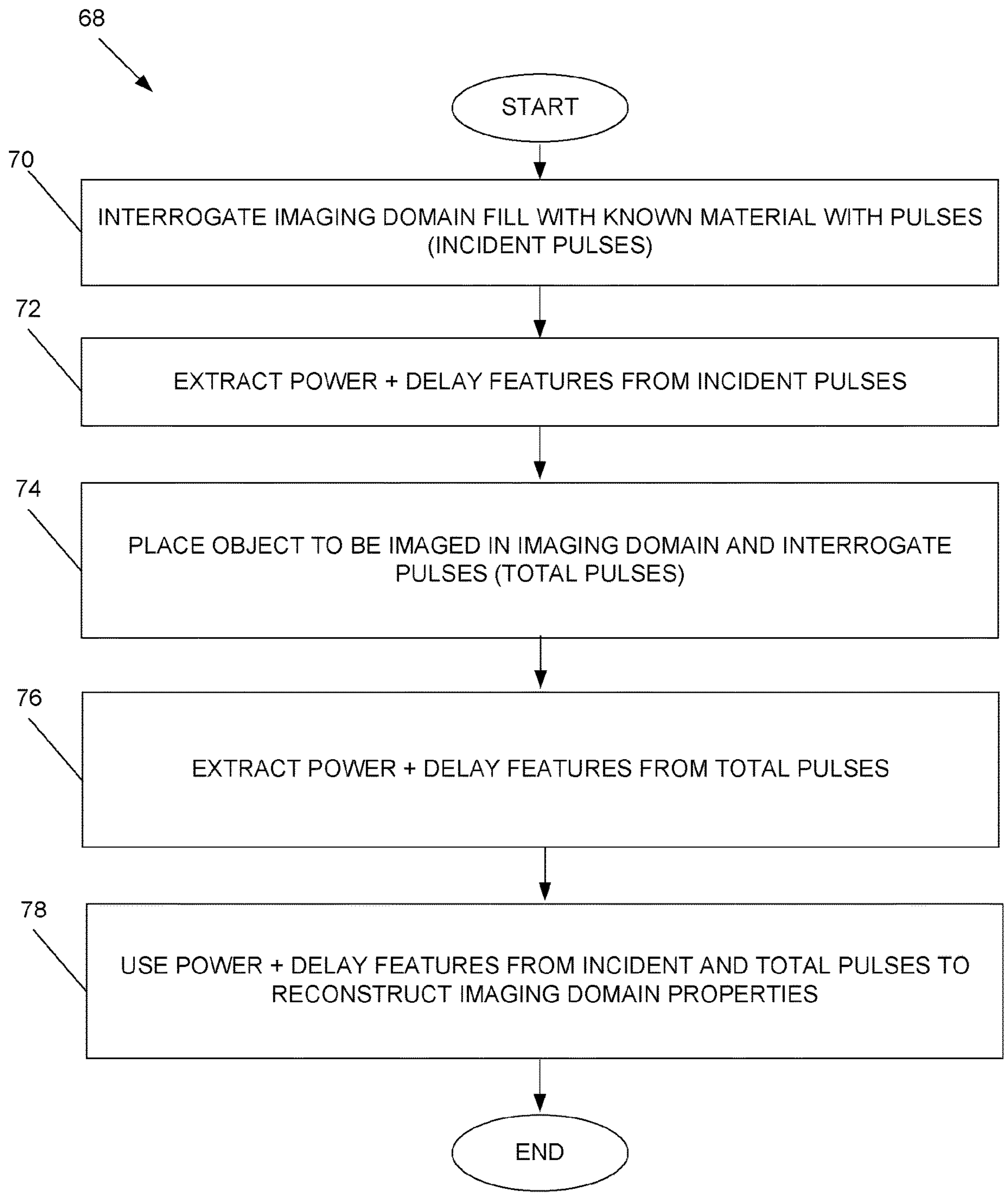

Referring to FIG. 3B, one embodiment of an example process of scattered-field imaging (68) comprises the following: fill the imaging domain with a known material, and interrogate the imaging domain with pulses (referred to herein as incident pulses) (70), extract power and delay features from the incident pulses (72), place an object/material to be imaged in the imaging domain, and interrogate with pulses (referred to herein as total pulses) (74), extract power and delay features from the total pulses (76), and use power and delay features from the incident and total pulses to reconstruct properties of the imaging domain (78).

In general, total-field imaging may be used when incident scans are unavailable, though it requires compensation factors. Scattered-field imaging requires no knowledge of the imaging system, except for antenna positions, yet it only works when incident pulse data are available.

Referring again to FIG. 2 with continued reference to FIGS. 3A and 3B, and referring to a scattered-field imaging framework, suppose that both incident and total scans are available, and that the properties of the incident medium are known. Let $$c_{INC}^{-1}$$

and $\alpha_{INC}$ be the known properties of the incident medium. Let $$c_{TOT}^{-1}$$

and $\alpha_{TOT}$ be the properties of the unknown medium. Let $$t_{TOT}^{(i,j)}$$

and $$p_{TOT}^{(i,j)}$$

be the time-of-arrival and pulse power as measured with the unknown imaging medium. Let $$t_{INC}^{(i,j)}$$

and $$p_{INC}^{(i,j)}$$

be the time-of-arrival and pulse power as measured with the known incident medium. With equations 18 and 19, the following may be derived:

$$\int_{C(i,j)} c_{INC}^{-1}(\vec{r}(I))dl = t_{INC}^{(i,j)} - d_{CBL}^{(i)} - d_{CBL}^{(j)} \quad (20)$$

$$\int_{C(i,j)} \alpha_{INC}(\vec{r}(I))dl = (-10^5/fc)\ \log_{10} p_{INC}^{(i,j)} - (-10^5/fc)\ \log_{10}\left(P_0 a_{CBL}^{(i)} a_{ANT}^{(i)} a_{ANT}^{(j)} a_{CBL}^{(j)}\right) \quad (21)$$

$$\int_{C(i,j)} c_{INC}^{-1}(\vec{r}(I))dl = t_{TOT}^{(i,j)} - d_{CBL}^{(i)} - d_{CBL}^{(j)} \quad (22)$$

$$\int_{C(i,j)} \alpha_{TOT}(\vec{r}(I))dl = (-10^5/fc)\ \log_{10} p_{TOT}^{(i,j)} - (-10^5/fc)\ \log_{10}\left(P_0 a_{CBL}^{(i)} a_{ANT}^{(i)} a_{ANT}^{(j)} a_{CBL}^{(i)}\right) \quad (23)$$

The compensation factors may be eliminated by subtracting equation 20 from equation 22, and subtracting equation 21 from 23.

$$\int_{C(i,j)} c_{TOT}^{-1}(\vec{r}(I))dl = \int_{C(i,j)} c_{INC}^{-1}(\vec{r}(I))dl = t_{TOT}^{(i,j)} - t_{INC}^{(i,j)} \quad (24)$$

$$\int_{C(i,j)} \alpha_{TOT}(\vec{r}(I))dl = \int_{C(i,j)} \alpha_{INC}(\vec{r}(I))dl = (-10^5/fc)\ \log_{10} p_{TOT}^{(i,j)} - (-10^5/fc)\ \log_{10} p_{INC}^{(i,j)} \quad (25)$$

The properties are expanded in some basis. Expressing the properties as a linear combination of basis functions, the following may be expressed:

$$c_{INC}^{-1} = \sum_{k=1}^{N} c_{k,INC}^{-1} \phi k(\vec{r}) \quad (26)$$

$$\alpha_{INC} = \sum_{k=1}^{N} \alpha_{k,INC} \phi k(\vec{r}) \quad (27)$$

-continued $$c_{TOT}^{-1} = \sum_{k=1}^{N} c_{k,TOT}^{-1} \phi k(\vec{r}) \quad (28)$$

$$\alpha_{TOT} = \sum_{k=1}^{N} \alpha_{k,TOT} \phi k(\vec{r}) \quad (29)$$

Let $$\varsigma c_k{}^{-1} = c_{k,TOT}^{-1} - c_{k,INC}^{-1},$$

and let $\zeta\alpha_k = \alpha_{k,TOT} - \alpha_{k,INC}$. Then, equations 24 and 25 are modified as follows:

$$\sum_{k=1}^{N} \varsigma c_k{}^{-1} \int_{C(i,j)} \phi k(\vec{r}(I))dl = t_{TOT}^{(i,j)} - t_{INC}^{(i,j)} \quad (30)$$

$$\sum_{k=1}^{N} \varsigma \alpha_k{}^{-1} \int_{C(i,j)} \phi k(\vec{r}(I))dl = (-10^5/fc)\ \log_{10} p_{TOT}^{(i,j)} - (-10^5/fc)\ \log_{10} p_{INC}^{(i,j)} \quad (31)$$

Enforcing this relationship for each i-j path, the following matrix equations may be expressed:

$$L\underline{\varsigma c^{-1}} = \underline{t}_{TOT} - \underline{t}_{INC} \quad (32)$$

$$L\underline{\varsigma \alpha} = (-10^5/fc)\ \log_{10}(\underline{p}_{TOT}) - (-10^5/fc)\ \log_{10}(\underline{p}_{INC}) \quad (33)$$

Here, L is a matrix where each row corresponds to some path from a transmitter to a receiver, with the entries in that row being the integrals of the chosen basis functions along that path. The right-hand-side terms are difference vectors of the power and delay features that were extracted from the measured incident and total pulses. The properties of the unknown medium can be determined by (1) solving the above systems of equations for $\underline{\lambda c^{-1}}$ and $\underline{\zeta\alpha}$, (2) adding $\underline{\zeta c^{-1}}$ and $\underline{\zeta\alpha}$ to the properties of the incident medium, and (3) expanding the properties of the total medium in the given basis with the now-known basis coefficients.

Referring to the total-field imaging framework, total-field imaging is used when there are no incident pulses. In this case, only equations 10 and 11 are applied for the total pulses. Then, the following is expressed, where $(-10^5/fc)$ $\log_{10}$ $$\left(P_0 a_{CBL}^{(i)} a_{ANT}^{(i)} a_{ANT}^{(j)} a_{CBL}^{(j)}\right)$$

is compressed to $A^{(i,j)}$ and $$d_{CBL}^{(i)} + d_{CBL}^{(j)}$$

is compressed to $D^{(i,j)}$ for notational clarity.

$$\int_{C(i,j)} c_{TOT}^{-1}(\vec{r}(I))dl = t_{TOT}^{(i,j)} - D^{(i,j)} \quad (34)$$

$$\int_{C(i,j)} \alpha_{TOT}(\vec{r}(I))dl = (-10^5/fc)\ \log_{10} p_{TOT}^{(i,j)} - A^{(i,j)} \quad (35)$$

Again, representing $c^{-1}$ and a in the chosen basis, the following is expressed:

$$\sum_{k=1}^{N} c_{k,T0T}^{-1} \int_{C(i,j)} \phi k(\vec{r}(I)) dl = t_{T0T}^{(i,j)} - D^{(i,j)} \tag{36}$$

$$\sum_{k=1}^{N} \alpha_{k,TOT} \int_{C(i,j)} \phi k(\vec{r}(I)) dl = (-10^5/fc) \log_{10} p_{T0T}^{(i,j)} - A^{(i,j)} \tag{37}$$

Enforcing this relationship for each i-j path, there are the following matrix equations.

$$L\underline{c^{-1}}_{TOT} = \underline{t}_{TOT} - \underline{D} \tag{38}$$

$$L\alpha_{TOT} = (-10^5/fc) \log_{10}(\underline{p}_{TOT}) - \underline{A} \tag{39}$$

In total-field imaging, the properties of the unknown medium are recovered directly by solving these two matrix equations.

The process of extracting delay and power features from measured pulses is not infallible. It is possible that the time-of-arrival determination algorithm will fail, and assign a wrong value. It is often possible to identify these errors, because it is generally known how long it should take a pulse to propagate through a medium, even if the medium is technically unknown. For example, assuming the speed of propagation in grain is 1×108 $ms^{-1}$, an electromagnetic pulse travelling on a 3 m path through some grain and some air may take [(3 m)/(3×$10^8$ $ms^{-1}$)]=10 ns, up to [(3 m)/(1×$10^8$ $ms^{-1}$)]=30 ns. Similar bounds can be calculated for attenuation through the unknown medium. The effect of these identifiably erroneous data can be ignored by deleting their corresponding rows from the matrix systems above.

Time-of-flight tomography relies on the availability of time-domain data. The current measurement hardware (i.e. a vector network analyzer or VNA) does not produce time-domain data. Instead, the current measurement hardware produces frequency-domain data. Specifically, the hardware produces S-parameters at a range of frequencies. The following describes example steps that may be taken to translate those S-parameters into useful data for time-of-flight tomography. S-parameters from the VNA may be transformed into time-domain data via an inverse Fourier transform (e.g., the ifft function in Matlab). For instance, the S-parameter datasets may comprise VNA measurements, sampled with one of the following two configurations: (1) df=1 MHz, and data are sampled at {1 df, 2 df, . . . , 1299 df, 1300 df} or (2) df=500 kHz, and data are sampled at {2 df, 3 df, . . . , 1300 df, 1301 df}. Suppose there are N VNA measurements. To use the ifft function, the data should be sampled at the following frequencies, in order:

{0df,1df,2df, . . . (N−1)df,Ndf,−(N−1)df,−(N−1) df, . . . ,−2df,−1df}

The measurement at 0 df is absent from all sets of data, so it is assumed that the measurement for 0 df is 0. The measurement at 1 df is also set to zero when it is missing from the set of measurements, such as in the second case above. The measurements at the negative frequencies are absent from the measured data, however, they may be extrapolated from the available data. Since real-valued time domain signals are sought, the measurement at −i×df is the complex conjugate of the measurement at i×df. Conversion may be performed using a few Matlab commands, which are shown in the example Matlab command1 and Matlab command2 below:

```
Matlab command1
zero_prefixed_spec=[0; spectrum];
formatted_spec=[spectrum; zero_prefixed_spectrum (end
  −1:−1:2)]
time_domain_signal=ifft (formatted_spec);
Matlab command2
zero_prefixed_spec=[0; 0; spectrum];
formatted_spec=[spectrum; zero_prefixed_spectrum (end
  −1:−1:2)]
time_domain_signal=ifft (formatted_spec);
```

The Matlab commands convert VNA measurements to time-domain signals. The Matlab command1 assumes the DC measurement is missing from the VNA measurements, and the Matlab command2 assumes the DC measurement, and the 1 df measurement are missing from the VNA data.

Scattered-field imaging is generally not possible in grain bins, since it is not practical to ask farmers to empty their bins to obtain incident field scans. Therefore, there is a reliance on total-field imaging. Total field imaging relies on compensation factors, and the time-of-arrival compensation factors may be extracted from S11 data as shown in FIG. 2. One technique for extracting cable delays from S11 data is based on the fact that the S11 scan, when converted to a time-domain signal, contains a very strong peak, which indicates the echo from the antenna-grain interface. That echo time represents double the cable delay. The temporal compensation factor for the i-j transmitter-receiver path is the sum of the delays of cables i and j.

The 3D time-of-flight tomography algorithm was tested against a set of data that consists of S21 scans captured in a grain bin as it was being filled, then emptied. For each S21 scan in the set, a wave-speed map was generated, using the following configuration: temporal offsets determined via S11 reflections, a polynomial basis up to degree 4, and scattered-field formulation, since an empty-bin measurement exists in the data set. The results were compared against the labelled data on the basis of fill volume. The data set includes accurate grain volume measurements. The time-of-flight tomography algorithm for this test case supplies a 3D map of wave-speed, within the convex hull of the antennas. Therefore, it is possible to extract a volume of grain from the time-of-flight tomography results. Note that the time-of-flight tomography algorithm is unable to interrogate the space outside the convex hull of the antennas. In this particular bin, the initial loads of grain fall below the antennas, so they were not measured by the time-of-flight tomography algorithm. This means that there is an offset between the labelled grain volume and the calculated grain volume. The procedure for computing grain volumes from the polynomial-basis reconstructions and comparing them to the known grain volumes is as follows: (1) for each grain bin scan, (a) convert frequency-domain S21 into time-domain pulses, (b) generate wave-speed map from time-domain pulses, using the configuration above, (c) separate wave-speed map into grain and air via a threshold value, (d) calculate volume occupied by grain via numerical integral, (e) log the calculated grain volume, (2) extract contemporary measured grain volumes from labelled data, and (3) calculate an optimal offset to account for invisible grain. The estimate of the grain surface (estimated by generating a contour plot of the wave-speed map at 2.4×$10^8$ $ms^{-1}$) revealed surface plots that showed the ray-based inversions indeed tracking the grain heap as grain is added to the bin and subsequently removed. In other words, the ray-based imaging algorithm produces good, quantitative images of grain properties.

It is of interest to be able to extract information about the physical properties of grain inside a storage bin. These includes information about the volume, shape and moisture of the grain. To obtain images with accurate shape and moisture (e.g., by way of complex electromagnetic permittivity), some prior knowledge of the grain properties and/or shape is used. One method of extracting feature information from collected grain bin data is to use rational fitting techniques to obtain complex poles and residues. In this technique, each received signal is approximated as a sum of damped sinusoids, with frequency components $\omega_i$ and damping coefficients $\alpha_i$. It has been demonstrated that the resonant frequency inside a grain bin shifts with change in fill volume. As grain is a lossy material, the damping coefficient increases as the signal travels through a larger amount of grain. Additionally, both the resonant frequency and amount of loss in grain vary with change in moisture content.

In one embodiment, a neural network is used to map complex pole data to physical features. One method of organizing the input complex pole data is to concatenate vectors of $\alpha+j\omega$ for each antenna pair within a bin. As an illustrative example, each test bin contains 24 antennas, so there are 24×23=552 antenna pairs. The received signal from each pair may consist of tens of poles, making the input feature vector on the order of $10^3\times1$. The output vector consists of a small number of physical features, such as grain volume, height, angle and moisture—approximately 4×1. One embodiment of a neural network architecture comprises a densely connected neural network. Simulated data with known (e.g., labelled) physical feature vectors are used to train the network. Ideally, the network is able to generalize to also predict on feature vectors from experimentally collected data.

Having described one embodiment of an example ray-based imaging system 28 of an electromagnetic imaging system, another embodiment of an electromagnetic imaging system comprises a resonance system. The resonance system is configured to estimate the volume and shape of grain inside a grain storage bin. The resonance system comprises a model that maps resonant frequency to fill volume based on an analysis of the electromagnetic resonances of the bin and how the resonances change with fill volume. In other words, the predicted fill volume may be used to provide an approximate cone angle at the grain surface. In one embodiment, the resonance system is configured to estimate the height, cone angle and permittivity of grain inside a storage bin, given the data collected by the antennas mounted inside the bin. This estimate may be used as a starting point for 3D inversion algorithms, and in some embodiments, provides an improvement (e.g., greater accuracy, lower computational cost) over the current methods for establishing an initial guess. Also, compared to existing systems that use a subset of the collected data, certain embodiments of the resonance system use the entirety of the data (e.g., from the example above, all 1300 data points) to find information about the bin and the bulk of the grain within the bin, which reduces the chances of obtaining poor results as a good percentage of the overall data is above the noise level (which also reduces the dependence on different, individual frequencies since all frequencies are used to improve the robustness of the system). As explained above, the ray based and resonance based systems may be combined to improve overall performance in some embodiments.

The resonance system is based on considering the grain bin as a resonant chamber, and analyzing how the resonant modes change as grain of varying permittivities are added and removed. Once a relationship between the resonances and the grain's shape and permittivity is determined, the resonant frequencies of collected signals may be used to make predictions about the grain inside the bin. Experimental data has been collected from a test bin and the simulated data generated using Meep, which is a finite-difference time-domain simulation software package known in the industry. Note that other time-domain simulation software may be used in some embodiments.

Explaining further, the main resonant frequency of the antennas inside a grain bin are different when an antenna is in air compared to when it is covered in grain. This observation can be used to estimate the height of the grain against the inner wall of a bin from Syy data. However, as the surface of the grain is generally not flat, knowing which antennas are buried only goes so far in estimating the true shape and amount of grain present. Looking at the collected Sxy data, there are several other resonances that occur aside from the main resonance. By finding a resonance that changes with fill volume, as opposed to the material that the antenna is in, a better estimate of fill volume is provided.

In one example test case, to know what frequency range to explore, the grain bin was considered to be a cylindrical resonant cavity. The electromagnetic resonance of a finite cylindrical resonant cavity can be solved for analytically in known manner. For simplicity, the shape of the bin is approximated as a cylinder with height equal to the bin's eave height. Then, using observations of resonant angular frequency variation with geometry of a cylindrical resonant cavity (for various low-frequency modes), the ratio d/R0=5.3473/3.6385≈1.47. The lowest frequency mode, $TM_{010}$, should occur at $\omega R_0/c\approx2.3$, which corresponds to a resonant frequency of 30 MHz. Thus, both experimental and synthetic data were analyzed in the 10-50 MHz range.

After studying the frequency-domain data from different transmitter-receiver pairs, it was observed that two resonant frequencies—at approximately 18 MHz and 27 MHz—both change according to the fill level in the bin. As grain is added, the resonances both shift toward lower frequencies. This trend is seen in both the simulated and experimental data sets. The antennas used to observe this trend are both located close to the bottom of the bin. For all but the very lowest fill volumes, both antennas are in grain. When looking at the same data for antennas that are in air, the resonant peaks become harder to distinguish at some fill volumes. In the simulated data, the first resonance is small and does not shift as much with fill volume. In both data sets, the second resonance is shifted higher, but not much of a trend was found from either resonance in the experimental data. An alternative way to visualize the trend of the resonant frequencies is to extract the frequencies where the peaks occur and set the rest of the signal to zero. Then for each of the curves, an array of all zeros except for at the peak locations is obtained. The values at the peak locations are all set to 1. These arrays are then stacked one above the other to form a matrix, and resulting images of simulated data and experimental data may be presented.

It is observed that the two datasets follow the same general trend. To obtain the experimental data, the grain bin had to be incrementally filled with known amounts of grain, and data, the grain volume and shape measured and recorded at each increment. Repeating this procedure for every grain bin is impractical, and thus one motivation for using Meep or other like software, where many different grain heights and angles can be simulated easily, and the data used to predict the fill volume of a real grain bin, given the resonances of the experimental data.

In one embodiment, simulated data may be used to build a library of known resonant frequency-fill volume mappings. When a data measurement is taken from a bin with unknown grain volume, its first resonant frequency is extracted from the Sxy data. This frequency is compared to all those in the library, and the fill volume corresponding to the most similar resonant frequency is selected. This process is repeated for multiple transmitter-receiver pairs. The resulting predicted fill volumes may be averaged. For instance, in the test case, all predictions were made using data where one antenna is the transmitter, and all other antennas are used as receivers. It was observed that the shift in the first resonant frequency due to grain volume follows the same general trend for simulated and experimental data, but the curve for experimental data is shifted to the left. To compensate for this shift, a correction factor (e.g., 1 MHz in this case) is added to each peak frequency extracted from experimental data. With this shift, the resonant frequency may be used to predict the fill volume in the bin quite accurately.

As to an embodiment of a prediction algorithm, the following example set up criteria may be followed: (a) one (1) antenna is selected as the transmitter, denoted T, (b) there is a list of receiving antennas, r=1 . . . R, (c) there are N simulated measurements, where data is collected from all R receivers. The resonant frequency, $f_{res}$ and the fill volume $f_v$ are known for each one. These make up the "model." Model vectors are denoted as follows:

$$\underline{fres}_{T,r}^{model} \in R^N \tag{40}$$

$$\underline{fv}_{T,r}^{model} \in R^N \tag{41}$$

Further, there is one (1) experimental data measurement, where the resonant frequency $$fres_{T,r}^{test} \in R$$

is known for each of the R receivers. This is the "test." The fill volume, $fv^{test}$, is unknown. One example algorithm used to predict the test fill volume is as follows:

Algorithm 1 Predict Test Fill Volume

```
correction_mhz = 1
for r=1:R do                          // loop through receivers
fres_{T,r}^{test} += correction_mhz
for i=1:N do                    // loop through model library
error_{T,r}(i) = | fres_{T,r}^{model}(i) - fres,_{T,r}^{tes} |
i* = argmin(error)
fv_{T,r}^{test, predicted} = fv_{T,r}^{model}(i*)
end
end
```

$$fv^{test,predicted} = \frac{1}{R}\sum_{r=1}^{R} fv_{T,r}^{test,predicted}$$

The above example algorithm may be extended to multiple transmitters and final predictions averaged. For the present example, the parameters used in the peak detection function to extract the resonant peaks have been tuned and tested for one of the antennas.

In one embodiment, the shape of grain inside a bin may be approximated as a cylinder plus a cone, where the cone may either be pointing up out of the cylinder and made of grain, or downward into the cylinder and made of air. The fill volume is then as follows:

$$FillVolume = CylinderVolume + ConeVolume \tag{42}$$

$$= \pi r^2 h_{cylinder} + \frac{1}{3}\pi r^2 h_{cone} \tag{43}$$

$$= \pi r^2 h_{cylinder} + \frac{1}{3}\pi r^3 \tan\theta \tag{44}$$

where r is the radius of the bin, $h_{cylinder}$ is the height of the cylindrical portion of the grain, $h_{cone}$ is the height of the cone, and ⊖ is the angle at the grain surface measured from the horizontal. The cone volume is positive for an upward-facing cone and negative for a downward-facing cone.

The height of the grain just inside the bin wall, $h_{cylinder}$, may be predicted by looking at the main resonance of Syy data. When an antenna is buried in grain, its main resonance shifts and becomes less prominent compared to when the antenna is in air. The position of each antenna in the bin is known. These two pieces of information may be used to determine the grain height. The radius of the bin is also known, leaving the cone angle ⊕ as the only unknown. Solving the above for ⊕ gives the following equation:

$$\theta = \arctan\left(\frac{FillVolume - \pi r2hcylinder}{\frac{1}{3}\pi r3}\right) \tag{45}$$

In practice, this becomes:

$$\theta^{predicted} = \arctan\left[\left(Fillvolume^{predicted} - \pi r^2 GrainHeight^{predicted}\right) \Big/ \left(\frac{1}{3}\pi r^3\right)\right] \tag{46}$$

To test the fill volume prediction algorithm, the resonant frequencies for a test case where all 46 cases of labelled Sxy data for a known bin were found and used with the prediction model generated by simulating the same bin in Meep. To account for the shift in resonant frequency between experimental and simulated data, a correction factor of 1 MHz was added to each experimental resonant frequency. To generate predictions, the predicted fill volumes from all receivers may be averaged. In some embodiments, a list of receivers may be selected based on an initial estimate of grain height.

For cone angles, predicted values were compared to those output by the Nelder Mead algorithm as the current "best guess." A comparison revealed for the test case that the two methods appear to agree on the direction of the cone for most test cases, though there is some variation in the exact angle.

In some cases, there are effects of permittivity on the grain bin's resonant frequency. For instance, based on simulated data, it is observed that the resonant frequency may shift with changes in grain moisture level (e.g., a shift toward lower frequencies with an increase in moisture). Different curves for different moisture levels suggests that the resonance system may be configured to estimate the moisture level of the grain, along with its volume and shape.

Figure 4:
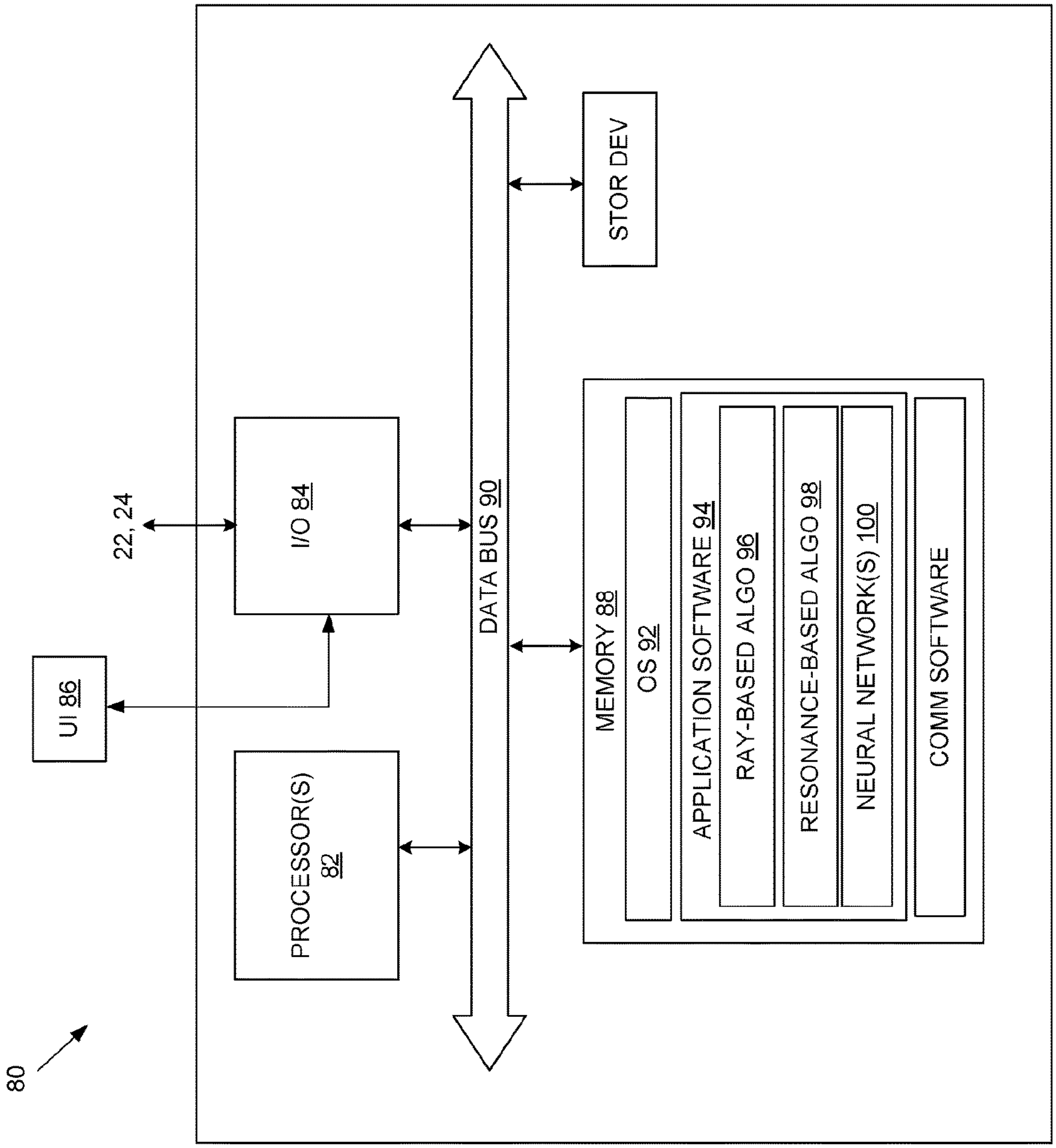
FIG. 4 is a block diagram that illustrates an example computing device of an electromagnetic imaging system.

Having described certain embodiments of an electromagnetic imaging system, attention is directed to FIG. 4, which illustrates an example computing device 80 used in one embodiment of electromagnetic imaging system. In one embodiment, the computing device 80 may be one or more of the servers 26 or one or more of the devices 20. Though described as implementing certain functionality of an electromagnetic imaging system in a single computing device 80, in some embodiments, such functionality may be distributed among plural devices (e.g., using plural, distributed processors) that are co-located or geographically dispersed. In some embodiments, functionality of the computing device 80 may be implemented in another device, including a programmable logic controller, application-specific integrated circuit (ASIC), field programmable gate array (FPGA), among other processing devices. It should be appreciated that certain well-known components of computers are omitted here to avoid obfuscating relevant features of computing device 80. In one embodiment, the computing device 80 comprises one or more processors (e.g., CPUs and/or GPUs), such as processor 82, input/output (I/O) interface(s) 84, a user interface 86, and memory 88, all coupled to one or more data busses, such as data bus 90. The memory 88 may include any one or a combination of volatile memory elements (e.g., random-access memory RAM, such as DRAM, and SRAM, etc.) and nonvolatile memory elements (e.g., ROM, hard drive, tape, CDROM, etc.). The memory 88 may store a native operating system, one or more native applications, emulation systems, or emulated applications for any of a variety of operating systems and/or emulated hardware platforms, emulated operating systems, etc. In the embodiment depicted in FIG. 4, the memory 88 comprises an operating system 92 and application software 94.

In one embodiment, the application software 94 comprises a ray-based algorithm module 96, a resonance-based algorithm module 98, and one or more neural networks 100. The ray-based algorithm module 96 comprises functionality described in association with FIGS. 2, 3A, and 3B, and hence are omitted here for brevity. Similarly, the resonance-based algorithm module 98 comprises the functionality associated with the description above for the resonance system, and likewise is omitted here for brevity. The one or more neural networks 100 comprise deep learning techniques that are used to both extract information from the algorithms associated with the ray-based algorithm module 96 and the resonance-based algorithm module 98, and also for data fusion, as described above.

Memory 88 also comprises communication software that formats data according to the appropriate format to enable transmission or receipt of communications over the networks and/or wireless or wired transmission hardware (e.g., radio hardware). In general, the application software 94 performs the functionality described in association with the ray-based and resonance based techniques described above.

In some embodiments, one or more functionality of the application software 94 may be implemented in hardware. In some embodiments, one or more of the functionality of the application software 94 may be performed in more than one device. It should be appreciated by one having ordinary skill in the art that in some embodiments, additional or fewer software modules (e.g., combined functionality) may be employed in the memory 88 or additional memory. In some embodiments, a separate storage device may be coupled to the data bus 90, such as a persistent memory (e.g., optical, magnetic, and/or semiconductor memory and associated drives).

The processor 82 may be embodied as a custom-made or commercially available processor, a central processing unit (CPU), graphics processing unit (GPU), or an auxiliary processor among several processors, a semiconductor based microprocessor (in the form of a microchip), a macroprocessor, one or more ASICs, a plurality of suitably configured digital logic gates, and/or other well-known electrical configurations comprising discrete elements both individually and in various combinations to coordinate the overall operation of the computing device 80.

The I/O interfaces 84 provide one or more interfaces to the networks 22 and/or 24. In other words, the I/O interfaces 84 may comprise any number of interfaces for the input and output of signals (e.g., analog or digital data) for conveyance over one or more communication mediums.

The user interface (UI) 86 may be a keyboard, mouse, microphone, touch-type display device, head-set, and/or other devices that enable visualization of the contents, container, and/or physical property or properties of interest, as described above. In some embodiments, the output may include other or additional forms, including audible or on the visual side, rendering via virtual reality or augmented reality based techniques.

Note that in some embodiments, the manner of connections among two or more components may be varied. Further, the computing device 80 may have additional software and/or hardware, or fewer software.

The application software 94 comprises executable code/instructions that, when executed by the processor 82, causes the processor 82 to implement the functionality shown and described in association with the electromagnetic imaging system. As the functionality of the application software 94 has been described in the description corresponding to the aforementioned figures, further description here is omitted to avoid redundancy.

Execution of the application software 94 is implemented by the processor(s) 82 under the management and/or control of the operating system 92. In some embodiments, the operating system 92 may be omitted. In some embodiments, functionality of application software 94 may be distributed among plural computing devices (and hence, plural processors), or among plural cores of a single processor.

When certain embodiments of the computing device 80 are implemented at least in part with software (including firmware), as depicted in FIG. 4, it should be noted that the software can be stored on a variety of non-transitory computer-readable medium (including memory 88) for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the computing device 80 are implemented at least in part with hardware, such functionality may be implemented with any or a combination of the following technologies, which are all well-known in the art: a discrete logic circuit(s) having logic gates for implementing logic functions upon data signals, an ASIC having appropriate combinational logic gates, a programmable gate array(s) (PGA), an FPGA, etc.

Figure 5:
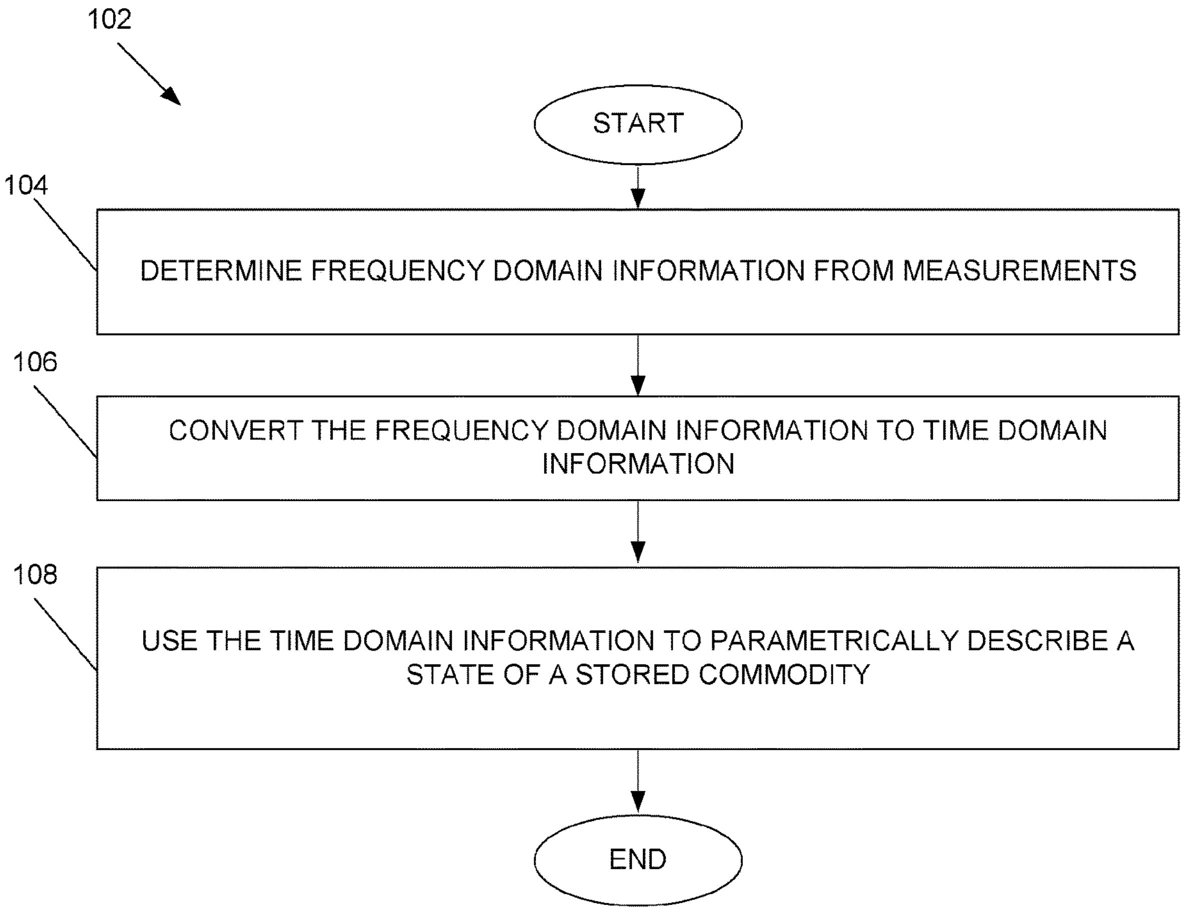
FIG. 5 is a flow diagram that illustrates an embodiment of an example ray-based imaging method.

Having described certain embodiments of an electromagnetic imaging system, it should be appreciated within the context of the present disclosure that one embodiment of a ray-based imaging method, denoted as method 102 and illustrated in FIG. 5, and implemented using one or more processors (e.g., of a computing device or plural computing devices), comprises determining frequency domain information from measurements (104); converting the frequency domain information to time domain information (106); and using the time domain information to parametrically describe a state of a stored commodity (108).

Figure 6:
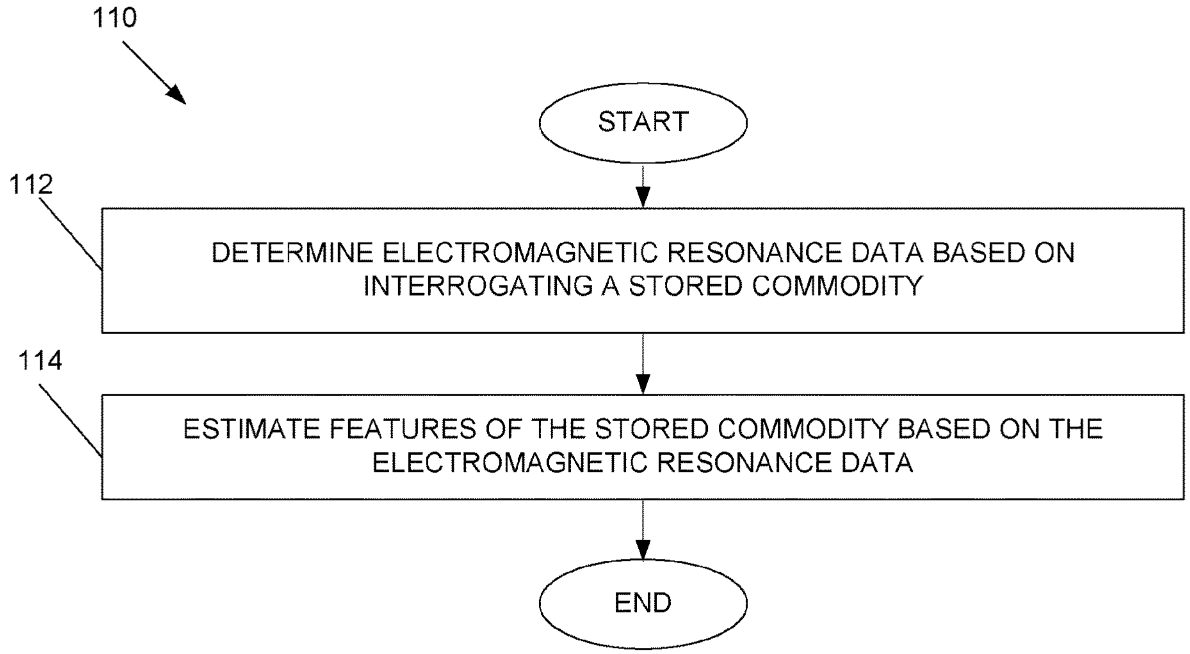
FIG. 6 is a flow diagram that illustrates an embodiment of an example resonance-based imaging method.

Further, it should be appreciated within the context of the present disclosure that one embodiment of a resonance-based imaging method, denoted as method 110 and illustrated in FIG. 6, and implemented using one or more processors (e.g., of a computing device or plural computing devices), comprises determining electromagnetic resonance data based on interrogating a stored commodity (112); and estimating features of the stored commodity based on the electromagnetic resonance data (114).

Any process descriptions or blocks in flow diagrams should be understood as representing logic (software and/or hardware) and/or steps in a process, and alternate implementations are included within the scope of the embodiments in which functions may be executed out of order from that shown or discussed, including substantially concurrently, or with additional steps (or fewer steps), depending on the functionality involved, as would be understood by those reasonably skilled in the art of the present disclosure.

Certain embodiments of an electromagnetic imaging system creates high-order parametric models that may describe shape, moisture-content, temperature, or density maps, among other information, of a stored commodity. The higher order parametric models or algorithms may in some embodiments be created by fusing information obtained from several techniques and algorithms, including the electromagnetic ray-based inversions of the relevant physical parameters of the grain and the measured electromagnetic resonances within the storage bin. In some embodiments, deep learning techniques may be used for both the extraction of information from the above-described methods as well as in the data fusion process.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the scope of the disclosure. All such modifications and variations are intended to be included herein within the scope of this disclosure and protected by the following claims.

The invention claimed is:

1. An electromagnetic imaging method, comprising:

determining frequency domain information from measurements;

converting the frequency domain information to time domain information; and using the time domain information to parametrically describe a state of a stored commodity;

wherein parametrically describing the state of the stored commodity comprises:

representing one or more properties of an imaging domain of the stored commodity using a set of basis coefficients corresponding to basis functions that collectively span the imaging domain;

deriving a matrix by integrating the basis functions along a plurality of transmitter-receiver paths; and using the matrix and the time domain information in a system of algebraic equations to determine the basis coefficients and derive a wave speed of the stored commodity; and wherein each basis function of the set has a support of sufficient breadth to be intersected by at least one of the plurality of transmitter-receiver paths.

2. The method of claim 1, wherein determining comprises determining S-parameter measurements.

3. The method of claim 1, wherein the time domain information comprises one or a combination of time-of-arrival information or peak power detection and compensation factors.

4. The method of claim 3, wherein the one or more properties comprises one, or a combination, of inverse speed and attenuation.

5. The method of claim 4, further comprising deriving either one, or a combination, of permittivity and conductivity of the stored commodity based on the inverse speed and/or attenuation.

6. The method of claim 1, further comprising providing a three-dimensional (3D) wave speed image based on the derived wave speed.

7. The method of claim 6, further comprising providing the 3D wave speed image to one or a combination of a display device, an inversion imaging algorithm, or a neural network.

8. The method of claim 1, wherein the basis functions comprise polynomial basis functions.

9. The method of claim 1, wherein the set of basis functions comprises a plurality of basis functions having overlapping supports.

10. An electromagnetic imaging system, comprising:

memory comprising instructions; and one or more processors configured by the instructions to:

determine frequency domain information from measurements;

convert the frequency domain information to time domain information; and use the time domain information to parametrically describe a state of a stored commodity;

wherein, to use the time domain information to parametrically describe the state of the stored commodity, the one or more processors are further configured to:

represent one or more properties of an imaging domain of the stored commodity using a set of basis coefficients corresponding to basis functions that collectively span the imaging domain;

derive a matrix by integrating the basis functions along a plurality of transmitter-receiver paths; and use the matrix and the time domain information in a system of algebraic equations to determine the basis coefficients and derive a wave speed of the stored commodity; and wherein each basis function of the set has a support of sufficient breadth to be intersected by at least one of the plurality of transmitter-receiver paths.

11. The system of claim 10, wherein the one or more processors are further configured by the instructions to reconstruct a three-dimensional (3D) wave speed image based on the derived wave speed.

12. The system of claim 11, wherein the one or more processors are further configured by the instructions to reconstruct the 3D wave speed image based on total-field imaging and scattered-field imaging.

13. The system of claim 12, wherein the one or more processors are further configured by the instructions to implement the total-field imaging by:

extracting power and delay features from measured pulses of an imaging domain corresponding to the stored commodity with unknown properties; and using the power and delay features and information about an imaging system for the imaging domain to reconstruct properties of the imaging domain.

14. The system of claim 12, wherein the one or more processors are further configured by the instructions to implement the scattered-field imaging by:

extracting power and delay features from incident pulses resulting from interrogation of an imaging domain having known material;

extracting power and delay features from total pulses resulting from interrogation of an object in the imaging domain having known material; and using the power and delay features from the incident and total pulses to reconstruct properties of the imaging domain.

15. The system of claim 10, wherein the set of basis functions comprises a plurality of basis functions having overlapping supports.

16. The system of claim 10, wherein the basis functions comprise polynomial basis functions.

17. A non-transitory, computer-readable storage medium comprising instructions that, when executed by one or more processors, cause the one or more processors to:

determine frequency domain information from measurements;

convert the frequency domain information to time domain information; and use the time domain information to parametrically describe a state of a stored commodity;

wherein, to use the time domain information to parametrically describe the state of the stored commodity, the instructions cause the one or more processors to:

represent one or more properties of an imaging domain of the stored commodity using a set of basis coefficients corresponding to basis functions that collectively span the imaging domain;

derive a matrix by integrating the basis functions along a plurality of transmitter-receiver paths; and use the matrix and the time domain information in a system of algebraic equations to determine the basis coefficients and derive a wave speed of the stored commodity; and wherein each basis function of the set has a support of sufficient breadth to be intersected by at least one of the plurality of transmitter-receiver paths.

18. The non-transitory, computer-readable storage medium of claim 17, wherein the set of basis functions comprises a plurality of basis functions having overlapping supports.

19. The non-transitory, computer-readable storage medium of claim 17, wherein the basis functions comprise polynomial basis functions.

* * * * *